(12) United States Patent
Feng et al.

(10) Patent No.: US 8,048,256 B2
(45) Date of Patent: *Nov. 1, 2011

(54) CARBON NANOTUBE FILM STRUCTURE AND METHOD FOR FABRICATING THE SAME

(75) Inventors: Chen Feng, Beijing (CN); Kai-Li Jiang, Beijing (CN); Liang Liu, Beijing (CN); Xiao-Bo Zhang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 903 days.

This patent is subject to a terminal disclaimer.

(21) Appl. No.: 12/002,129

(22) Filed: Dec. 14, 2007

(65) Prior Publication Data

US 2008/0248235 A1 Oct. 9, 2008

(30) Foreign Application Priority Data

Feb. 9, 2007 (CN) .......................... 2007 1 0073265

(51) Int. Cl.
*B32B 5/08* (2006.01)
*B32B 5/12* (2006.01)
*B32B 5/18* (2006.01)
*B32B 5/22* (2006.01)
*B32B 5/26* (2006.01)

(52) U.S. Cl. ... 156/305; 428/105; 428/107; 428/311.11; 428/311.51; 428/315.5; 428/317.1; 428/408; 428/304.4; 427/122; 427/180; 427/202; 427/331; 427/372.2; 427/402; 977/742; 156/297; 156/299

(58) Field of Classification Search .................. None
See application file for complete search history.

(56) References Cited

U.S. PATENT DOCUMENTS 6,712,864 B2 * 3/2004 Horiuchi et al. ................ 23/314
(Continued)

FOREIGN PATENT DOCUMENTS

JP 2003-286017 * 10/2003
(Continued)

OTHER PUBLICATIONS

Spinning and processing continuous yarns from 4-inch wafer scale super-aligned carbon nanotube arrays,Adv. Mater 2006, 18, 1505-1510,2006 WILEY-VCH Verlag GmbH & Co. KGaA, Weinheim.
(Continued)

*Primary Examiner* — Vivian Chen
(74) *Attorney, Agent, or Firm* — Altis Law Group, Inc.

(57) ABSTRACT

A carbon nanotube film structure includes at least two overlapped carbon nanotube films, with adjoining films being aligned in different directions. Each carbon nanotube film includes a plurality of successive carbon nanotube bundles aligned in the same direction. The carbon nanotube structure further includes a plurality of micropores formed by/between the adjoining carbon nanotube bundles. A method for fabricating the carbon nanotube film structure includes the steps of: (a) providing an array of carbon nanotubes; (b) pulling out, using a tool, one carbon nanotube film from the array of carbon nanotubes; (c) providing a frame and adhering the carbon nanotube film to the frame; (d) repeating steps (b) and (c), depositing each successive film on a preceding film, thereby achieving at least a two-layer carbon nanotube film; and (e) peeling the carbon nanotube film off the frame to achieve the carbon nanotube structure.

18 Claims, 3 Drawing Sheets

U.S. PATENT DOCUMENTS

| | | | |
|---|---|---|---|
| 6,924,335 B2 | 8/2005 | Fan et al. | |
| 7,054,064 B2 | 5/2006 | Jiang et al. | |
| 7,244,373 B1 * | 7/2007 | Anazawa et al. | 252/500 |
| 7,459,627 B2 * | 12/2008 | Lee et al. | 174/28 |
| 7,537,825 B1 * | 5/2009 | Wardle et al. | 428/292.1 |
| 7,586,249 B2 | 9/2009 | Jiang et al. | |
| 7,780,496 B2 * | 8/2010 | Liu et al. | 445/50 |
| 7,799,163 B1 * | 9/2010 | Mau et al. | 156/247 |
| 2004/0047038 A1 | 3/2004 | Jiang et al. | |
| 2004/0071949 A1 | 4/2004 | Glatkowski et al. | |
| 2004/0105807 A1 | 6/2004 | Fan et al. | |
| 2004/0166235 A1 * | 8/2004 | Fujii et al. | 427/77 |
| 2006/0018018 A1 | 1/2006 | Nomura et al. | |
| 2006/0121185 A1 | 6/2006 | Xu et al. | |
| 2007/0103052 A1 | 5/2007 | Jeng et al. | |
| 2008/0299460 A1 * | 12/2008 | Feng et al. | 429/231.8 |
| 2009/0075171 A1 * | 3/2009 | Feng et al. | 429/209 |
| 2009/0085461 A1 * | 4/2009 | Feng et al. | 313/498 |
| 2009/0104832 A1 * | 4/2009 | Fu et al. | 445/24 |
| 2009/0159188 A1 * | 6/2009 | Jiang et al. | 156/235 |
| 2009/0159328 A1 * | 6/2009 | Dai et al. | 174/350 |
| 2009/0160799 A1 * | 6/2009 | Jiang et al. | 345/173 |
| 2009/0170394 A1 * | 7/2009 | Liu et al. | 445/49 |
| 2009/0181239 A1 * | 7/2009 | Fan et al. | 428/327 |
| 2009/0195139 A1 * | 8/2009 | Wei et al. | 313/307 |
| 2009/0195140 A1 * | 8/2009 | Wei et al. | 313/307 |
| 2009/0239072 A1 * | 9/2009 | Wei et al. | 428/402 |
| 2009/0239439 A1 * | 9/2009 | Wei et al. | 445/46 |
| 2009/0289203 A1 * | 11/2009 | Jiang et al. | 250/492.1 |
| 2010/0075469 A1 * | 3/2010 | Liu et al. | 438/151 |
| 2010/0270911 A1 * | 10/2010 | Liu et al. | 313/503 |
| 2010/0282403 A1 * | 11/2010 | Liu et al. | 156/229 |

FOREIGN PATENT DOCUMENTS

| | | | |
|---|---|---|---|
| JP | 2005-097003 | * | 4/2005 |
| TW | 200410901 | | 7/2004 |
| TW | I238555 | | 8/2005 |
| TW | I245303 | | 12/2005 |
| TW | I248630 | | 2/2006 |
| TW | I257639 | | 7/2006 |
| TW | I277124 | | 3/2007 |
| TW | 200713384 | | 4/2007 |
| WO | WO 00/73204 | * | 12/2000 |
| WO | WO 2007/055744 | * | 5/2007 |
| WO | WO 2007/061428 | * | 5/2007 |

OTHER PUBLICATIONS

Ashavani Kumar, Victor L. Pushparaj, Swastik Kar, Omkaram Nalamasu, and Pulickel M. Ajayan:"Contact transfer of aligned carbon nanotube arrays onto conducting substrates", Applied Physics Letters, 89, 163120(Oct. 19, 2006).

* cited by examiner

CARBON NANOTUBE FILM STRUCTURE AND METHOD FOR FABRICATING THE SAME

RELATED APPLICATIONS

This application is related to commonly-assigned applications: U.S. patent application Ser. No. 12/002,169, entitled, "OPTICAL POLARIZER AND METHOD FOR FABRICATING THE SAME", filed Dec. 14, 2007, which is now patented as U.S. Pat. No. 7,710,649; U.S. patent application Ser. No. 12/002,143, "ANODE OF LITHIUM BATTERY AND METHOD FOR FABRICATING THE SAME", filed Dec. 14, 2007, which is now published as U.S. patent publication No. 20080299460, and U.S. patent application Ser. No. 12/002,144, "FIELD EMISSION CATHODE AND METHOD FOR FABRICATING THE SAME", filed Dec. 14, 2007, which is now patented as U.S. Pat. No. 7,872,407. Disclosures of the above-identified applications are incorporated herein by reference.

BACKGROUND

1. Field of the Invention

The present invention relates to a carbon nanotube film structure and a method for fabricating the same.

2. Discussion of Related Art

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). CNTs are electrically conductive along their length, chemically stable, and each can have a very small diameter (much less than 100 nanometers) and large aspect ratios (length/diameter). Due to these and other properties, it has been suggested that CNTs can play an important role in many fields, such as microscopic electronics, field emission devices, thermal interface materials, etc.

However, the main obstacle to an actual application of carbon nanotube use is their difficulty to process, due to the powder form of the carbon nanotube products. Therefore, carbon nanotubes are formed into films to facilitate handling and processing thereof.

At present, different methods are widely used for fabricating carbon nanotube films including: a growing method, a spraying method, and a Langmuir-Blodgett (LB) method.

Through the growing method, a carbon nanotube film is grown on a chemically functionalized substrate directly by adopting multiple catalyst layers. However, the method typically requires high temperature during growing process and cannot be applied to such a substrate made of plastic.

Through the spraying method, carbon nanotubes, dispersed in a solvent, are sprayed on a substrate. In this method, however, carbon nanotubes cannot be well-dispersed, due to an aggregation thereof, and thus, a uniform film cannot be formed.

Through the Langmuir-Blodgett (LB) method, carbon nanotubes are soluble through an introduction of amide groups therein, and then through a step of "molecular self-assembly", the film accumulates on a substrate. However, the method has such a problem that carbon nanotubes are disordered in the film.

What is needed, therefore, is to provide a carbon nanotube film structure and a method for fabricating the same, in which the above problems are eliminated or at least alleviated.

SUMMARY

In one embodiment, a carbon nanotube film structure includes at least two overlapped carbon nanotube films aligned along different directions. Each carbon nanotube film includes a plurality of successive carbon nanotube bundles aligned along the same direction. The carbon nanotube film structure further includes a plurality of micropores formed by the carbon nanotube bundles.

In another embodiment, a method for fabricating the above-described carbon nanotube film structure includes the steps of: (a) providing an array of carbon nanotubes; (b) pulling out, by a tool, one carbon nanotube film from the array of carbon nanotubes; (c) providing a frame, adhering the carbon nanotube film to the frame; (d) repeating the step (b) and the step (c) to thereby achieve a multi-layer carbon nanotube film structure; and (e) peeling the carbon nanotube film structure off the frame to achieve a self-sustained carbon nanotube film structure.

Other advantages and novel features of the present carbon nanotube film structure and method for fabricating the same will become more apparent from the following detailed description of preferred embodiments when taken in conjunction with the accompanying drawings.

BRIEF DESCRIPTION OF THE DRAWINGS

Many aspects of the present invention of the carbon nanotube film structure and related method for fabricating the same can be better understood with reference to the following drawings.

Figure 1:
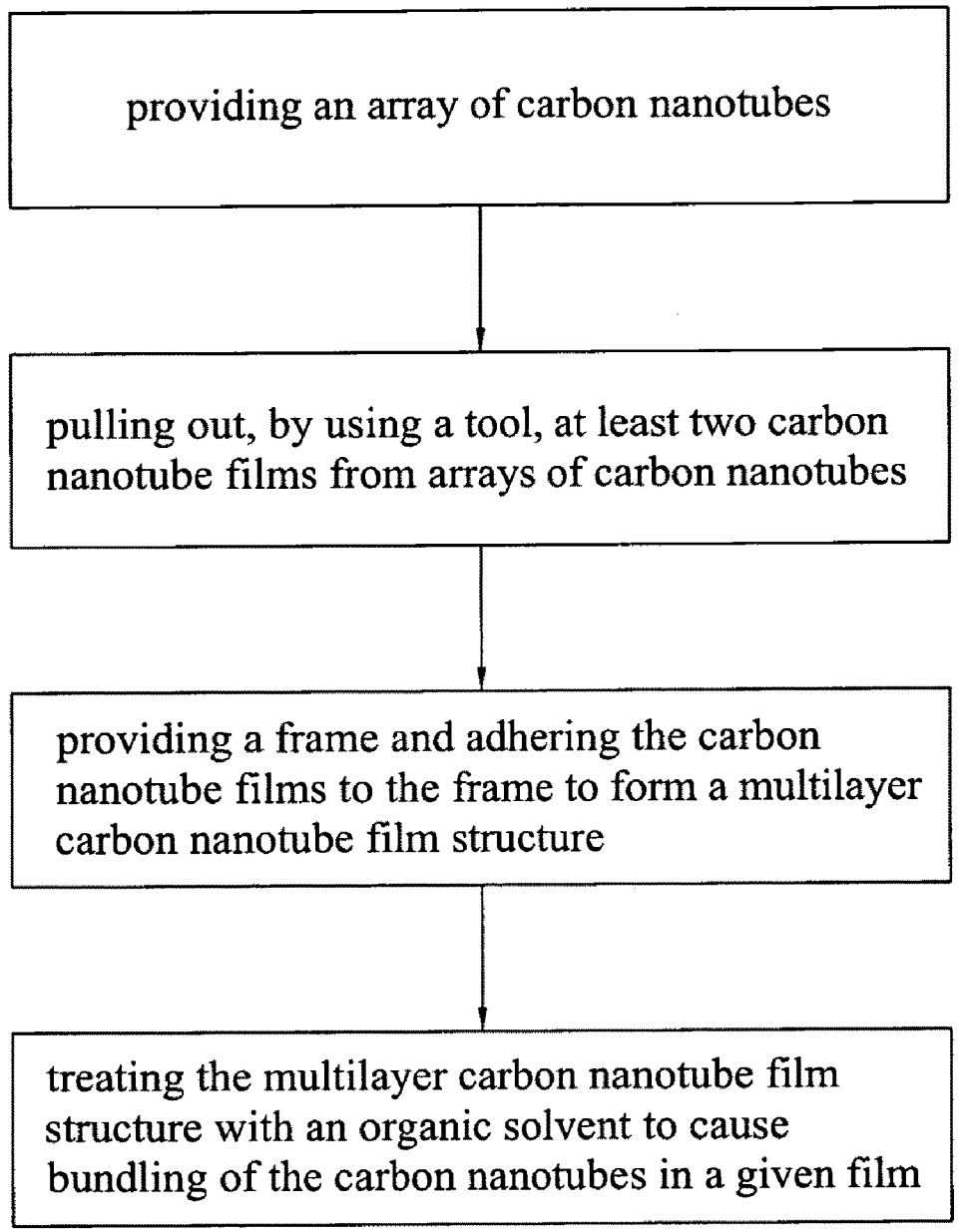
FIG. 1 is a flow chart of a method for fabricating a carbon nanotube film structure, in accordance with a present embodiment.

Corresponding reference characters indicate corresponding parts throughout the several views. The exemplifications set out herein illustrate at least one preferred embodiment of the present carbon nanotube film structure and related method for fabricating the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present carbon nanotube film structure and method for fabricating the same.

Referring to FIG. 1, a method for fabricating the carbon nanotube film structure includes the steps of: (a) providing an array of carbon nanotubes, quite suitably, providing a super-aligned array of carbon nanotubes; (b) pulling out a first carbon nanotube film from the array of carbon nanotubes, by using a tool (e.g., adhesive tape or another tool allowing multiple carbon nanotubes to be gripped and pulled simultaneously); (c) providing a frame and adhering the first carbon nanotube film to the frame along a first direction and removing the excess film outside the frame; (d) pulling out a second carbon nanotube film from the array of carbon nanotubes and adhering the second carbon nanotube film to the frame along a second direction to overlap the first carbon nanotube film to thereby form a two-layer carbon nanotube film structure; and (e) peeling the carbon nanotube film structure off the frame to achieve the carbon nanotube film structure.

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst at a temperature in the approximate range from 700° C. to 900° C. in air for about 30 to 90 minutes; (a4) heating the substrate with the catalyst at a temperature in the approximate range from 500° C. to 740° C. in a furnace with a protective gas therein; and (a5) supplying a carbon source gas into the furnace for about 5 to 30 minutes and growing a super-aligned array of the carbon nanotubes from the substrate.

In step (a1), the substrate can, beneficially, be a P-type silicon wafer, an N-type silicon wafer, or a silicon wafer with a film of silicon dioxide thereon. Quite usefully, a 4-inch P-type silicon wafer is used as the substrate.

In step (a2), the catalyst can, advantageously, be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can, advantageously, be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, be in a height of about 200 to 400 microns and includes a plurality of carbon nanotubes paralleled to each other and substantially perpendicular to the substrate. The super-aligned array of carbon nanotubes formed under the above conditions is essentially free of impurities, such as carbonaceous or residual catalyst particles. The carbon nanotubes in the super-aligned array are packed together closely by van der Waals attractive force.

In step (b), the first carbon nanotube film can, beneficially, be pulled out from the super-aligned array of carbon nanotubes by the substeps of: (b1) selecting a plurality of carbon nanotube segments having a predetermined width; and (b2) pulling the carbon nanotube segments at an even/uniform speed to form the first carbon nanotube film.

In step (b1), quite usefully, the carbon nanotube segments having a predetermined width can be selected by using a wide adhesive tape as the tool to contact the super-aligned array. In step (b2), the pulling direction is, usefully, substantially perpendicular to the growing direction of the super-aligned array of carbon nanotubes.

More specifically, during the pulling process, as the initial carbon nanotube segments are drawn out, other carbon nanotube segments are also drawn out end to end, due to the van der Waals attractive force between ends of the adjacent segments. This process of drawing ensures a successive carbon nanotube film can be formed. The carbon nanotubes of the carbon nanotube film are all substantially parallel to the pulling direction, and the carbon nanotube film produced in such manner is able to formed to have a selectable, predetermined width.

The width of the first carbon nanotube film depends on the size of the carbon nanotube array. The length of the first carbon nanotube film is arbitrary. In one useful embodiment, when the size of the substrate is 4 inches, the width of the first carbon nanotube film is in the approximate range from 1 centimeter to 10 centimeters, and the thickness of the first carbon nanotube film is in the approximate range from 0.01 to 100 microns.

In step (c), the frame is advantageously a square or rectangular metal frame using arbitrary metallic material (most suitably, a chemically and mechanically durable metal/alloy). The size of the frame is depends on the actual needs of utilization. When the width of the frame is larger than the width of the first carbon nanotube film, a plurality of the first carbon nanotube films can be adhered on the frame side by side and parallel to each other.

It is noted that because the carbon nanotubes in the super-aligned array in step (a) has a high purity and a high specific surface area, the first carbon nanotube film is adhesive. As such, in step (c), the first carbon nanotube film can be adhered to the frame directly. The first carbon nanotube film is, beneficially, fixed on/to the frame at an edge thereof.

In step (d), the first carbon nanotube film and the second carbon nanotube film are combined (i.e., attached to one another) by van de Waals attractive force to form a stable two-layer film structure. Additionally, a discernable angle between the first direction and the second direction is in the approximate range from greater than about 0° to about 90°. In one useful embodiment, the angle is about 90°.

Quite beneficially, a third carbon nanotube film or a plurality of carbon nanotube films can be provided and adhered to the frame one after another to form a multi-layer carbon nanotube film structure. The number of the layers is arbitrary and depends on the actual needs/use.

In one useful embodiment, an additional step (f) of treating the carbon nanotube film structure with an organic solvent can, advantageously, be further provided before the step (e).

In step (f), the organic solvent is volatilizable and can be selected from the group consisting of ethanol, methanol, acetone, dichloroethane, chloroform, and combinations thereof. The carbon nanotube film structure can, beneficially, be treated by either of two methods: dropping the organic solvent from a dropper to soak the entire surface of side carbon nanotube film structure or immerging the frame with the carbon nanotube film structure thereon into a container having an organic solvent therein. After being soaked by the organic solvent, the carbon nanotube segments in the carbon nanotube film can at least partially shrink into carbon nanotube bundles due to the surface tension created by the organic solvent. Due to the decrease of the specific surface via bundling, the coefficient of friction of the carbon nanotube film is reduced, but the carbon nanotube film maintains high mechanical strength and toughness. Further, due to the shrinking/compacting of the carbon nanotube segments into the carbon nanotube bundles, the parallel carbon nanotube bundles are, relatively, distant (especially compared to the initial layout of the carbon nanotube segments) to each other in one layer and cross with the parallel carbon nanotube bundles in each adjacent layer. As such, a carbon nanotube film having a microporous structure can thus be formed (i.e., the micropores are defined by the spacing/gaps between adjacent bundles). The resulting spacing can, beneficially, be about in the range of 100-500 mesh. Accordingly, the carbon nanotube film structure can be used, e.g., as a filtration membrane or as an electrode in a lithium battery. Besides, due to the excellent conductivity of the carbon nanotubes, the crossed carbon nanotube bundles can form a conductive network in the carbon nanotube film structure. This conductive network structure can be used in electromagnetic shielding.

It is to be understood that the microporous structure is related to the layer number of the carbon nanotube film structure. The greater the number of layers that are formed in the carbon nanotube film structure, the greater the number of bundles in the carbon nanotube film structure will be. Accordingly, the spacing/gaps between adjacent bundles and the diameter of the micropores will decrease. Further, a carbon nanotube film structure having arbitrarily width and length can be formed by piling a plurality of carbon nanotube films and partially overlapping such with each other. The width and length of the carbon nanotube film structure are not confined by the width and the length of the carbon nanotube film pulled from the array of carbon nanotubes.

Figure 2:
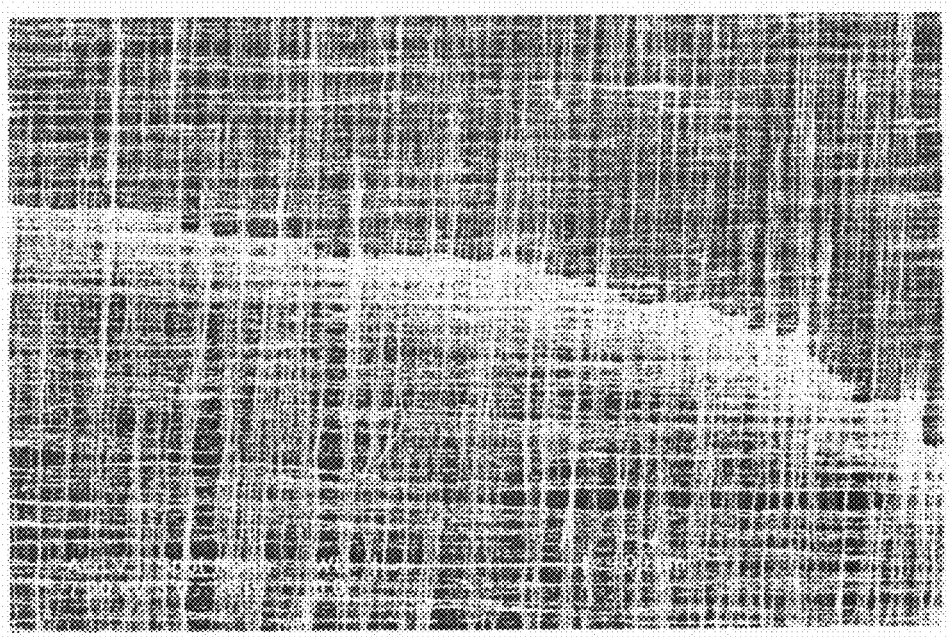
FIG. 2 shows a Scanning Electron Microscope (SEM) image of a two-layer carbon nanotube film structure, partially treated with ethanol.

Referring to FIG. 2, a two-layer carbon nanotube film structure, formed by the method described above, is shown. The carbon nanotubes in each layer are aligned. The angle between the aligned directions of the two layers is 90°. The two layers are combined by van de Warrls attractive force to form a stable film structure. After being treated with ethanol, the carbon nanotubes compact/shrink to bundles, and a space/distance is formed between every two adjacent bundles in each layer. Bundles in two layers cross with each other to form a microporous structure. The diameter of the respective micropores is in an approximate range of 10 nanometers to 10 microns.

Figure 3:
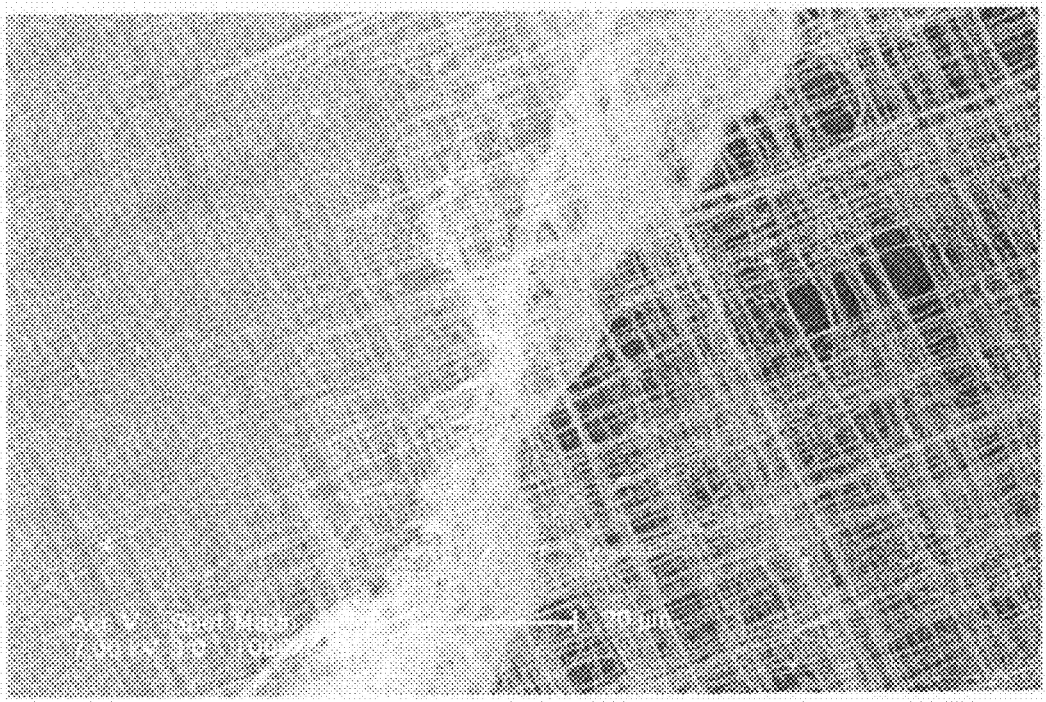
FIG. 3 shows a Scanning Electron Microscope (SEM) image of a four-layer carbon nanotube film structure, partially treated with ethanol.

Referring to FIG. 3, a four-layer carbon nanotube film structure, formed by the method described above, is shown. The carbon nanotubes in each layer are aligned. The angle between the aligned directions of any two adjacent layers is 90°. Four layers are combined by van de Warrls attractive force, with each subsequent carbon nanotube film being deposited directly on a preceding carbon nanotube film, to form a stable film structure. After being treated with ethanol, the carbon nanotubes compact/shrink to bundles and a space/distance is formed between every two adjacent bundles in each layer. Bundles in the four layers cross with each adjoining layer to form a microporous structure. The diameter of the respective micropores is in an approximate range from 1 nanometer to 1 micron.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A method for fabricating a carbon nanotube film structure, the method comprising the steps of:
    (a) providing an array of carbon nanotubes;
    (b) pulling out, by using a tool, one carbon nanotube film from the array of carbon nanotubes;
    (c) providing a frame and adhering the carbon nanotube film to the frame;
    (d) repeating step (b) and step (c), with each subsequent carbon nanotube film being deposited on a preceding carbon nanotube film, to thereby achieve the carbon nanotube film structure comprising at least two layers of carbon nanotube film; and
    (e) peeling the carbon nanotube film structure off the frame to achieve the carbon nanotube film structure.

2. The method as claimed in claim 1, further comprising a step (f) of treating the carbon nanotube film structure with an organic solvent.

3. The method as claimed in claim 2, wherein the organic solvent is comprised of at least one solvent selected from the group consisting of ethanol, methanol, acetone, dichloroethane, chloroform, and combinations thereof.

4. The method as claimed in claim 1, wherein each carbon nanotube film is comprised of a plurality of successive carbon nanotube bundles aligned in the same direction.

5. The method as claimed in claim 4, wherein the carbon nanotube bundles in a given carbon nanotube film are the same length.

6. The method as claimed in claim 1, wherein adjacent carbon nanotube films are aligned along different directions.

7. The method as claimed in claim 1, wherein step (a) further comprises growing the array of the carbon nanotubes to a height of about 200 to about 400 microns.

8. The method as claimed in claim 1, wherein step (b) further comprises the substeps of:
    (b1) selecting a plurality of carbon nanotube segments having predetermined width;
    (b2) pulling the carbon nanotube segments at a uniform speed and perpendicular to the growing direction of the array of the carbon nanotubes, in order to form a given carbon nanotube film.

9. The method as claimed in claim 1, wherein the carbon nanotube film structure is treated by dropping the organic solvent from a dropper to soak the entire surface of side carbon nanotube film structure or by immersing the frame with the carbon nanotube film structure thereon into a container having the organic solvent therein.

10. The method as claimed in claim 1, wherein the carbon nanotube film structure is treated by immersing the frame with the carbon nanotube film structure thereon into a container having the organic solvent therein.

11. The method as claimed in claim 1, further comprising a step of removing excess portion of the carbon nanotube film outside the frame.

12. The method as claimed in claim 1, wherein the frame is a square frame.

13. The method as claimed in claim 1, further comprising a step of adhering a plurality of the carbon nanotube films to the frame side by side in parallel to each other.

14. A method for fabricating a carbon nanotube film structure, the method comprising steps of:
    drawing a plurality of carbon nanotube films, wherein each of the plurality of carbon nanotube films is pulled out from an array of carbon nanotubes;
    providing a frame;
    adhering the plurality of carbon nanotube films to the frame;
    overlapping the plurality of carbon nanotube films with each other thereby achieving a carbon nanotube film structure; and
    peeling the carbon nanotube film structure off of the frame.

15. A method for fabricating a carbon nanotube film structure, the method comprising steps of:
    pulling out a first and second carbon nanotube films from an array of carbon nanotubes;
    providing a frame;
    adhering the first carbon nanotube film to the frame along a first direction;
    overlapping the second carbon nanotube film to the first carbon nanotube film along a second direction thereby forming a carbon nanotube film structure.

16. The method as claimed in claim 15, further comprising a step of treating the carbon nanotube film structure with an organic solvent to form a plurality of spaced and parallel carbon nanotube bundles in each of the first and second carbon nanotube films, wherein the plurality of spaced and parallel carbon nanotube bundles in the first carbon nanotube film are crossed with the plurality of spaced and parallel carbon nanotube bundles in the second carbon nanotube film, thereby defining a plurality of micropores in the carbon nanotube film structure.

17. The method as claimed in claim 16, wherein a size of the micropores in the carbon nanotube film structure is in a range of about 100 mesh to about 500 mesh.

18. The method as claimed in claim 15, wherein a discernable angle between the first direction and the second direction is about 90°.

* * * * *